(12) United States Patent
Kotchick et al.

(10) Patent No.: US 6,624,936 B2
(45) Date of Patent: Sep. 23, 2003

(54) COLOR-COMPENSATED INFORMATION DISPLAYS

(75) Inventors: Keith M. Kotchick, St. Paul, MN (US); Ikuko Ebihara, St. Paul, MN (US); Gregory E. Gilligan, Hastings, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 63 days.

(21) Appl. No.: 09/853,051

(22) Filed: May 10, 2001

(65) Prior Publication Data

US 2001/0055153 A1 Dec. 27, 2001

Related U.S. Application Data

(60) Provisional application No. 60/203,332, filed on May 11, 2000.

(51) Int. Cl.$^7$ .................................................. G02B 5/30
(52) U.S. Cl. ..................... 359/490; 359/485; 359/491; 349/119; 349/97; 349/181
(58) Field of Search ................. 359/490, 485, 359/491; 349/119, 97, 187

(56) References Cited

U.S. PATENT DOCUMENTS

| | | |
|---|---|---|
| 4,166,871 A | 9/1979 | Schuler |
| 4,416,946 A | 11/1983 | Bolt |
| 4,591,512 A | 5/1986 | Racich et al. |
| 5,400,158 A * | 3/1995 | Ohnishi et al. ............. 349/119 |
| 6,396,631 B1 | 5/2002 | Ouderkirk |
| 6,449,089 B1 | 9/2002 | Moshrefzadeh et al. |
| 2001/0019182 A1 | 9/2001 | Hebrink et al. |

FOREIGN PATENT DOCUMENTS

| | | |
|---|---|---|
| EP | 09 08 745 | 4/1999 |
| WO | WO 99/64928 | 12/1999 |

* cited by examiner

*Primary Examiner*—Audrey Chang
*Assistant Examiner*—Craig Curtis
(74) *Attorney, Agent, or Firm*—William D. Miller

(57) ABSTRACT

A polarizer has low color shift and is particularly well suited to use in an LCD display. The polarizer has a double pass color shift of $|\Delta x| \leq 0.005$ and $|\Delta y| \leq 0.005$ for illumination by a C-illuminant, and a double pass contrast modulation of at least 90%. The display includes two or more layers stacked together, at least one of the layers being an absorbing polarizer having a double pass color shift of $|\Delta x| \leq 0.005$ and $|\Delta y| \leq 0.005$ for illumination by a C-illuminant. A polarizer with a selected color shift is also used with a rear projection screen having a dispersing layer stacked together with first absorbing polarizer. The polarizer has a single pass color shift with at least one of $\Delta x$ and $\Delta y$ being negative under illumination by a C-illuminant, and a polarization co-efficiency greater than 90%.

33 Claims, 10 Drawing Sheets

COLOR-COMPENSATED INFORMATION DISPLAYS

CROSS-REFERENCE TO RELATED APPLICATIONS

This application claims priority from provisional patent application Ser. No. 60/203,332, filed on May 11, 2000, which is incorporated herein by reference.

FIELD OF THE INVENTION

The present invention is directed generally to systems for displaying information, and more particularly to information display systems having selected color compensation to enhance the color of the image viewed by the user.

BACKGROUND

Handheld devices, such as handheld personal assistants, cell phones and the like, typically use Twisted Nematic (TN) or Super Twisted Nematic (STN) Liquid Crystal Displays (LCD) as the information display layer. These displays offer ease of manufacture, passive multiplexed addressing schemes, and cost structures aligned with the end application. The display usually operates in a reflective/transflective mode such that ambient light provides the primary illumination for the non-emissive display. The use of ambient illumination eliminates the need for a constantly activated system light source, which is a problem with devices that use transmissive displays, such as laptop computers. In the event of low ambient lighting, transflective displays incorporate a supplemental backlight, which is commonly user activated. This allows the device to realize smaller size, lighter weight, smaller battery size, and longer battery life, all factors important in a portable, handheld device.

A TN or STN LCD typically requires a compensation film to provide color correction due to dispersion effects within the display. Without the added compensation film, the display creates spectrally peaked light and dark states instead of the desired white and black states. STN displays may use a wide variety of design prescriptions, with a unique compensation film providing optimum performance for each design. Even with the proper compensation film however, the TN or STN display still does not provide the desired white/black performance. Instead, most common displays manifest a green/black appearance. This deficiency is attributable in large part to the spectral performance of elements within the display.

SUMMARY OF THE INVENTION

The present invention addresses the spectral deficiencies of elements in a LCD unit, and offers a system solution for performance that more closely approaches the ideal white/black display characteristic.

Generally, the present invention relates to a polarizer that has spectral characteristics particularly well suited to use in an LCD display.

One particular embodiment of the invention is directed to an optical device, comprising an absorbing polarizer having a double pass color shift of $|\Delta x|\leq 0.005$ and $|\Delta y|\leq 0.005$ for illumination by a C-illuminant, and a double pass contrast modulation of at least 90%.

Another embodiment of the invention is directed to an optical device, comprising an absorbing polarizer having a double pass color shift of $\Delta x\leq 0.005$ and $\Delta y\leq 0.002$ and a double pass contrast modulation of at least 90% under illumination by an A-illuminant. The polarizer also has a double pass color shift of $\Delta x\leq 0.005$ and $\Delta y\leq 0.005$ under illumination by a C-illuminant.

Another embodiment of the invention is directed to a device for displaying information, comprising two or more layers stacked together, at least one of the layers being an absorbing polarizer having a double pass color shift of $|\Delta x|\leq 0.005$ and $|\Delta y|\leq 0.005$ for illumination by a C-illuminant.

Another embodiment of the invention is directed to a rear projection screen having a dispersing layer stacked together with first absorbing polarizer, the first absorbing polarizer having a single pass color shift with at least one of $\Delta x$ and $\Delta y$ being negative under illumination by a C-illuminant, and a polarization co-efficiency greater than 90%.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
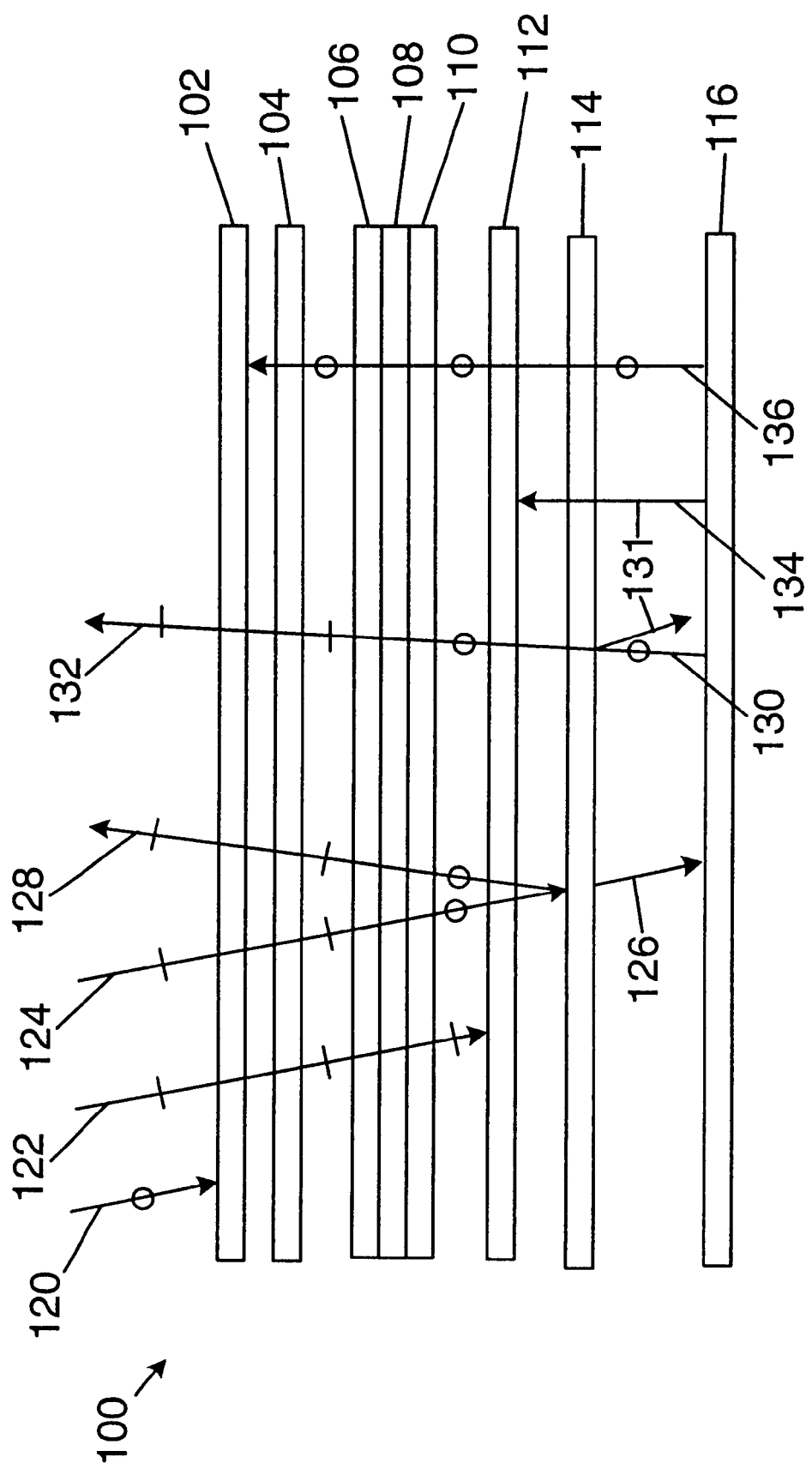
FIG. 1 schematically illustrates an embodiment of a display unit based on a liquid crystal display.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to absorbing polarizers, and is believed to be particularly suited to enhancing the spectral characteristics of information display systems that include one or more absorbing polarizers.

One particular embodiment of transflective display unit 100, based on a Super Twisted Nematic (STN) Liquid Crystal Display (LCD), is schematically illustrated in FIG. 1. The upper layer 102 is a first polarizer layer, typically an absorbing polarizer. The unit 100 may include a compensation layer 104 that provides birefringence compensation within the unit 100 so that the light viewed by the viewer is of a particular combination of colors. Often a reflective or transflective display based on a STN LCD presents black images to the viewer on a green background, as is commonly found with, for example a cell phone. Without the compensation layer, the unit would present a different combination of colors to the user.

Layers 106 and 110 are glass layers that sandwich the liquid crystal display (LCD) layer 108. The LCD layer 108 includes the liquid crystal material, driver electronics, and other associated internal elements such as alignment layers, color filters, black matrices, and transparent electrodes. The LCD layer 108 may include other types of liquid crystal different from super twisted nematic (STN) displays. The LCD layer 108 typically includes many independently addressable picture elements (pixels) whose polarization rotating properties may be selectively adjusted. In one example, the pixels may each be adjustable between zero polarization rotation and polarization rotation through 90°.

A second absorbing polarizer layer 112 intercepts the light transmitted through the LCD layer 108. In this particular embodiment, the pass polarization direction of the second polarizer layer is approximately orthogonal to the pass polarization direction of the first polarizer layer 102. A partial reflector 114 is disposed below the second polarizer layer to reflect a portion of the light passing through the second polarizer 112. A light source 116 is disposed below the partial reflector 114 to provide light for backlighting the display 100 when ambient light is insufficiently bright for the viewer to see the information displayed in the LCD layer 108.

The partial reflector 114 includes any suitable type of optical element that partially reflects and partially transmits incident light. For example, the partial reflector may include a layer of metal, such as silver or aluminum, that is sufficiently thin to transmit a fraction of the incident light.

Although ambient light is typically unpolarized, ambient light may be considered to be formed from two independent components that are orthogonally polarized. These different components are considered separately to facilitate understanding of how the unit 100 operates. Planar polarization states parallel to the plane of the figure are illustrated in FIG. 1 with a line, and polarization states perpendicular to the plane of the figure are illustrated with a circle. A first component 120 of the ambient light, having a polarization direction orthogonal to the pass direction of the first polarizer layer 102, is absorbed in the first polarizer. A second component 122 of the ambient light 122, has a polarization parallel to the pass direction of the first polarizer layer 102, and is transmitted through the first polarizer 102 and through the compensation layer 104 to the LCD layer 108. The polarization of the light 122 is not rotated by the LCD layer 108. The second polarizer layer 112 is oriented so that its pass polarization direction is orthogonal to the pass polarization direction of the first polarizer layer 102. Therefore, the 122 is absorbed in the second polarizer layer 112.

Light 124 has a polarization that is transmitted through the first polarizer layer 102. Light 124 passes through a portion of the LCD layer 108 that rotates the polarization of the light, and so the light 124 emerges from the LCD layer 108 in a polarization state perpendicular to the polarization state when it entered the LCD layer 108. Light 124, therefore, passes through the second polarizer layer 112 to the partial reflector 114. A first portion of the light 124 is transmitted through the partial reflector 114 as beam 126. A second portion of the light 124 is reflected as beam 128. The polarization direction of light beam 128 is parallel to the pass direction of the second polarizer layer 112, and is transmitted through to the LCD layer 108, which rotates the polarization of the light beam 128. Light beam 128 then passes up through the compensation layer 104 and is passed through the first polarizer layer 102, and emerges from the display unit 100 to be seen by the viewer.

Thus, by selective control of different picture elements (pixels) of the LCD layer 108, the ambient light incident on the display unit 100 may be selectively absorbed or reflected to the viewer. Control of the polarization rotation state of the different pixels of the LCD layer 108 results in control of the display image viewed by the viewer.

When there is insufficient ambient light for the viewer to readily view the image on the display unit 100, the back light 116 may be activated. Light emitted by the backlight 116 passes up through the display. For example, light beam 130, having a polarization direction that is parallel to the pass direction of the second polarizer layer 112, passes up through the second polarizer layer and through the LCD layer 108. Light 130 passes through a pixel of the LCD layer 108 that rotates the polarization of the light, and so light beam 130 emerges from the LCD layer in a rotated polarization state that is passed by the first polarizer layer 102, as light beam 132. A fraction of light beam 130 is reflected at the partial reflector 114 as reflected beam 131.

Some of the light emitted by the backlight 116, for example light beam 134, may be in a polarization state that is absorbed by the second polarizer layer 112. Some of the light emitted by the backlight 116, for example light beam 136, may be in a polarization state that is passed through the second polarizer layer 112, but also passed through a pixel of the LCD layer 108 that does not rotate the polarization of light, and so is absorbed in the first polarizer layer 108.

It will be appreciated that the different layers 102–114 need not be separated as illustrated, but any or all of the layers 102–114 may be bonded together using, for example, an optically transparent adhesive. Optical adhesive layers are omitted from the figure for clarity. Furthermore, the display unit 100 may include other layers, such as a touch panel or a cover lens, which may be located above layer 102, or located within the layer stack.

Furthermore, it will also be appreciated that the display unit 100 may operate in manner different from the illustrated embodiment. For example, in the illustrated embodiment, the display unit 100 is operated such that ambient light reflected to the viewer is polarization rotated by the LCD layer 108. In another embodiment, for example where the pass directions of the first and second polarizer layers 102 and 112 are parallel, the ambient light reflected to the viewer may not be polarization rotated by the LCD layer 108. Furthermore, the pass directions of the polarizers 102 and 112 need not be either parallel, in other words set at 0°, or perpendicular, set at 90°, but may be oriented at some value between 0° and 90°.

Ambient light, generated for example by the sun, overhead incandescent or fluorescent lamps, or any other type of light source, is usually normally perceived by human eyes as being white. Many artificial light sources emit red, green, and blue components, either broadband or at discrete wavelengths, that are integrated by the human eye so that the resultant observed color is white. If the display unit 100 maintains this input spectral power distribution, the light emitted from the display also appears to the viewer to be white. A number of different components, however, affect the color quality of the light passing through the display unit 100 so that the image under ambient lighting conditions has a color that is different from the ambient light incident on the display.

For example, the first and second polarizing layers 102 and 112 do not maintain equality in their spectral performance. Under ambient light operation, the light interacts with each of the first and second polarizing layers 102 and 112 twice, once on the input path and once on the return path. This double pass operation further separates actual performance from the desired spectrally neutral performance.

Figure 2A:
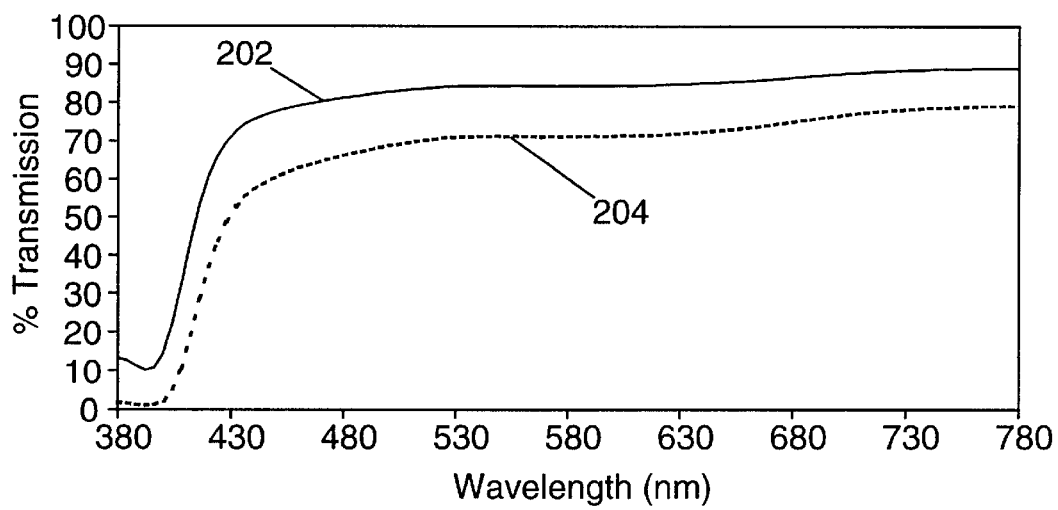
FIG. 2A illustrates transmission spectra of light passing through an absorbing polarizer for both a single and a double pass, where the light is polarized parallel to the pass state of the polarizer.
Figure 2B:
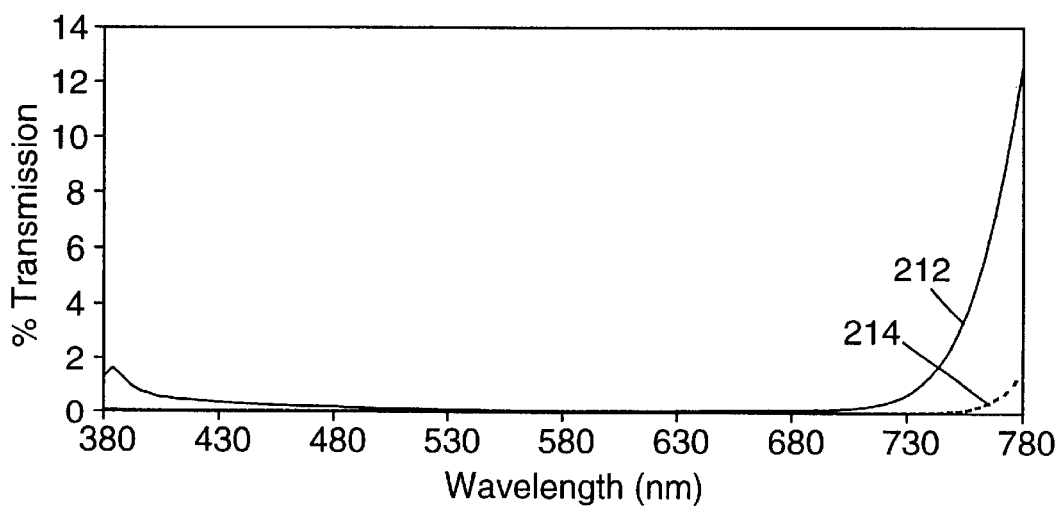
FIG. 2B illustrates transmission spectra of light passing through an absorbing polarizer for both a single and a double pass, where the light is polarized parallel to the block state of the polarizer.

Graphs showing single pass (1X) and double pass (2X) transmission profiles of a commercially available polarizer (Sanritz LLC2-5518), typically used in polarizing layers 102 and 112, are illustrated in FIGS. 2A and 2B. Transmission of light in the pass state is illustrated in FIG. 2A: curve 202 illustrates single pass transmission and curve 204 illustrated double pass transmission. The transmission of light polarized in the blocking state is illustrated in FIG. 2B: curve 212 illustrates single pass transmission and curve 214 illustrates double pass transmission.

The curves in FIGS. 2A and 2B show that the performance in the blue region of the spectrum, for example in the range of approximately 400 nm–480 nm, is different from the region of the spectrum above about 500 nm, particularly for light having a wavelength less than about 430 nm. This phenomenon is referred to as blue rolloff. The absorption of a portion of the blue component of the light polarized in the polarization transmission direction results in a shift in the color of the ambient light ultimately reflected to the viewer.

Three important system parameters can be defined for the elements of a display unit, namely overall efficiency, color shift, and contrast modulation. Efficiency is a measure of the display brightness expressed simply as the average photopic double pass polarized transmission of the top polarizer calculated against a standard illuminant. For a perfect polarizer, the efficiency equals 100%.

It is common to express color shift under illumination by a standard illuminant, such as an A-illuminant, B-illuminant, C-illuminant, D-illuminant or E-illuminant, which approximates the emission from a standard type of optical source. An A-illuminant, for example, replicates the emission spectrum from a tungsten filament having a color temperature of 1800 K. A C-illuminant is described as average daylight without the ultraviolet portion, and is commonly used for uniform color calculations. Standard illuminants are often presented in a look-up table as a function of spectral intensity as a function of wavelength.

Color shift expresses the shift in color after double passing polarizer when using a specific illuminant. It is common to express color shift under illumination by a standard illuminant, such as an A-illuminant, B-illuminant, C-illuminant, D-illuminant or E-illuminant. Color shift is calculated using the 1931 CIE chromaticity coordinates (x, y) and is expressed as the change (Δx, Δy) between the color co-ordinates of the illuminating light and the light after double passing the optical element under test. The transmission is measured for light that is passed normally through the polarizer. One common method of determining color shift is to measure the transmission spectrum of the polarizer for light in both the pass and block polarization states and use the measured transmission spectra to calculate the spectrum of light, emitted by a standard illuminant, after double passing through the polarizer.

Contrast modulation is the ratio of the difference of the double pass average photopic transmitted pass and block values over sum of the double pass average photopic transmitted pass and block values, when using a specific illuminant. Contrast modulation is a bounded metric ranging from 0 (no contrast) to 1 (perfect contrast). In other words, the contrast modulation, CM, is given by the expression:

$$CM=(I_p-I_b)/(I_p+I_b)$$

where $I_p$ and $I_b$ are the light intensities transmitted through a pair of the polarizers whose transmission axes are parallel and crossed respectively, averaged over the visible spectrum.

A summary of the double pass performance parameters for a polarizer, whose transmission characteristics are as illustrated in FIGS. 2A and 2B, are presented in Table I. The parameters are presented for double pass operation of the polarizer (5518), along with parameters for other commercially available polarizers, the Sanritz FSP (FSP), Santritz BLC2-5618 (BLC2), Nitto Low Color Polarizer (Nitto), and Sumitomo Chemical SR1262B (SR1262). The parameters are presented for illumination by both A- and C-illuminants.

TABLE I

Double Pass Performance Parameters of Conventional Absorbing Polarizers

| | Efficiency (%) | Δx | Δy | Contrast modulation |
|---|---|---|---|---|
| A-illuminant | | | | |
| 5518 | 71.1 | 0.0093 | 0.0092 | 0.996 |
| FSP | 78.4 | 0.0038 | 0.0059 | 0.995 |
| BLC2 | 75.3 | 0.0045 | 0.0060 | 0.994 |
| Nitto | 73.4 | 0.0017 | 0.0050 | 0.994 |
| SR1262 | 75.7 | 0.0039 | 0.0036 | 0.995 |
| C-illuminant | | | | |
| 5518 | 70.7 | 0.0143 | 0.0245 | 0.995 |
| FSP | 78.3 | 0.0066 | 0.0142 | 0.994 |
| BLC2 | 75.1 | 0.0074 | 0.0148 | 0.992 |
| Nitto | 73.5 | 0.0039 | 0.0117 | 0.991 |
| SR1262 | 75.5 | 0.0055 | 0.0098 | 0.994 |

The polarizers have high contrast modulation and good efficiency, but all demonstrate a significant color shift towards a yellow color, particularly when compared with a C-illuminant. The polarizer that shows the smallest color shift is the Nitto polarizer, where the color shift is less than or equal to 0.005 for both Δx and Δy when compared with an A-illuminant. However, when compared with a whiter light source, the color shift of the Nitto polarizer increases due to blue drop-off. When compared to a C-illuminant, the color shift of the Nitto polarizer increases to Δx=0.0039 and Δy=0.0117.

If the polarizer whose characteristics are illustrated in FIGS. 2A and 2B were to be used on a display in ambient positive mode (dark text with a light background), the ambient appearance would be very black text on a yellow background. It has been found that users do not prefer yellow displays, which are perceived as being of lower quality or "dingy". Consequently, display manufacturers use the first polarizer 102 to give very dark black state appearance, but adjust the other system components, for example by adding color filters in the LCD layer 108 to further change the color shift and substitute a green background for the otherwise yellow background. The choice of green for the bright state coincides with the eye photopic peak in the green portion of the visible spectrum and is more pleasing to the user's eye than yellow, but does not result in the desired neutral or white appearance.

The performance of the display unit is further degraded due to losses introduced by the elements below the LCD layer 108, namely the second polarizer layer 112 and the partial reflector 114. The second polarizer layer 112 may exhibit the same double pass performance as the first polarizer layer 102, thus causing compounded efficiency losses and color shifts.

In addition, since the partial reflector 114 performs the two conflicting functions of reflecting ambient light and transmitting backlight, its performance in performing each function is compromised. In order to transmit some of the backlight, the partial reflector 114 cannot reflect all of the incident ambient light. Likewise, in order to reflect some of the ambient light, the partial reflector 114 cannot transmit all of the backlight light. This results in a reduced system efficiency. The reflectivity of the partial reflector 114 is typically selected to be in the range of 50% to 90%.

Figure 3:
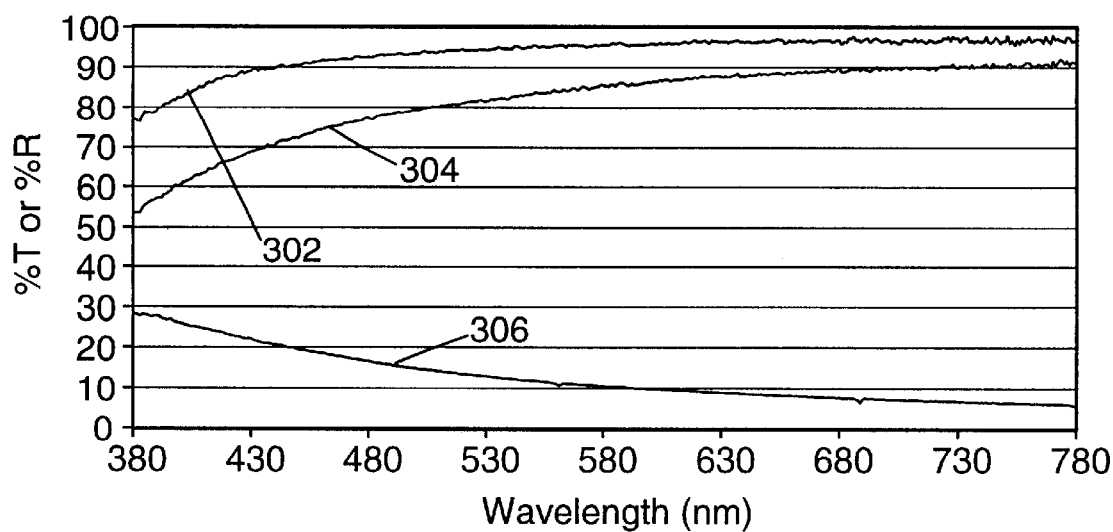
FIG. 3 illustrates reflection of an opaque and a transflective silver layer and transmission through the transflective silver layer.

Furthermore, the partial reflector 114 may impart some color shift upon reflection. Silver is becoming a common choice for the partial reflector 114 mirror plane because of its high reflectivity: it is used to increase efficiency at a given reflection/transmission ratio. However, the reflectivity of silver falls off in the blue region of the visible spectrum, further exaggerating the yellow shift resulting from the first and second polarizing layers 102 and 112. The spectral reflectivity of an opaque layer of silver is illustrated as curve 302 in FIG. 3, showing a significant reduction in reflection at blue wavelengths, for example in the range 400 nm–480 nm, compared to yellow (580 nm) or red (630–700 nm) wavelengths.

The blue rolloff is exaggerated when the silver layer becomes thinner. Thinner silver layers are required in order to permit some light to pass through from the backlight 116. Curve 304 illustrates the reflection of a transflective silver layer having an average reflectivity of 82%, compared with the average reflectivity of 94% for the opaque example of curve 302. Curve 306 illustrates the transmission through the transflective layer, with an average reflectivity of 13%. The difference between the reflectivities of the opaque and transflective silver layers are amplified, however, in the blue region of the spectrum. In the red portion of the spectrum, for example at 630 nm, the difference in transmission between the opaque and the transflective silver layers is about 10%. In the blue region of the spectrum, for example at 430 nm, the difference in transmission between the opaque and transflective layers is about 20%. Furthermore, the transmission of the transflective layer at about 600 nm is 10%, whereas the transmission at 400 nm is over 25%. Accordingly, the silver transflective layer also introduces a shift in the spectrum of both reflected and transmitted light.

The ambient spectral performance of the display unit 100 is determined by the convolution of the spectral performance of each of the elements 102–114. Discrete spectral losses, particularly in the blue portion of the spectrum, cause significant color shifts that prevent white ambient operation. In addition, amplitude losses reduce overall efficiency resulting in a lower brightness display.

Figure 4:
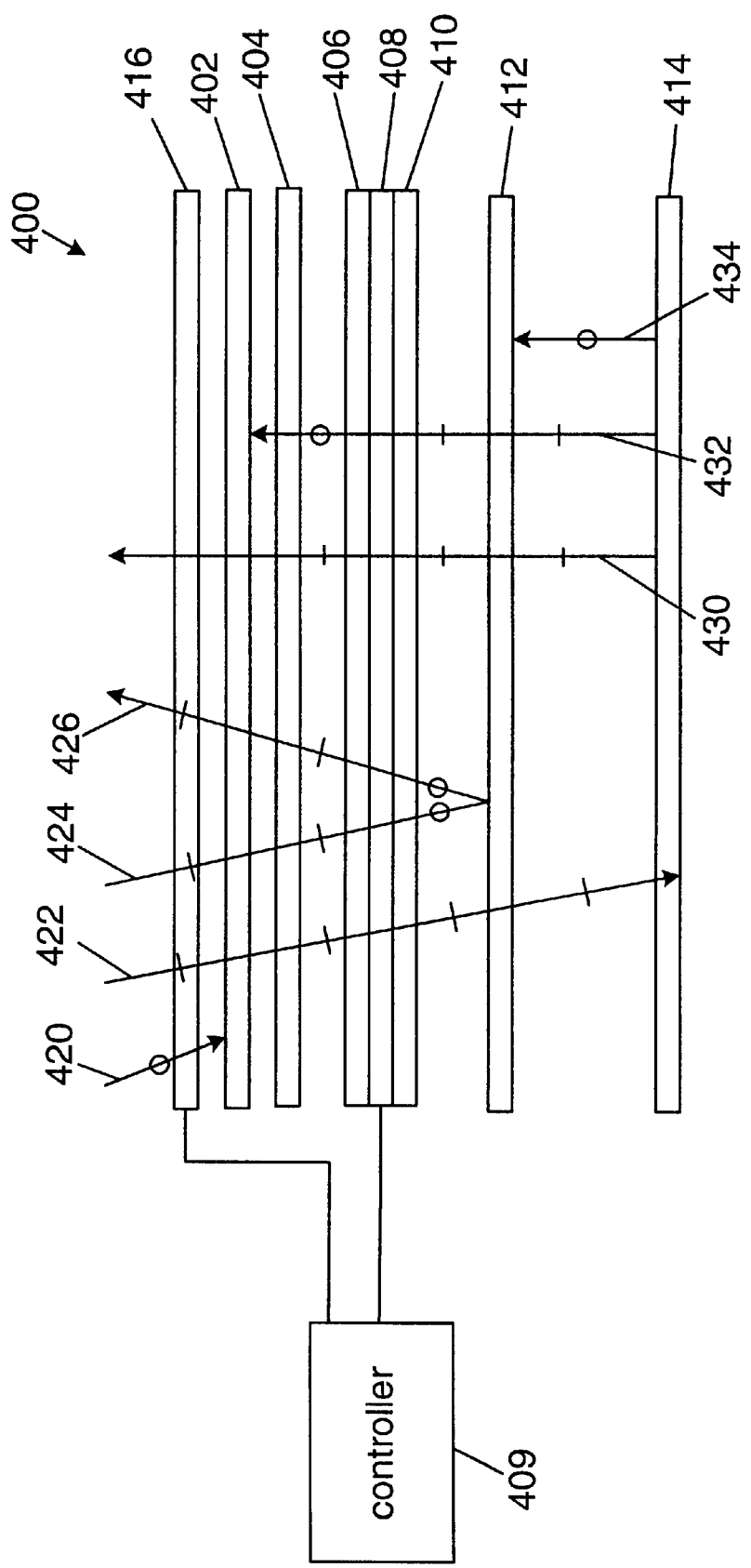
FIG. 4 illustrates an embodiment of a LCD display unit according to the present invention.

An embodiment of another LCD-based display unit 400 is schematically illustrated in FIG. 4. The first polarizer 402 is optically tuned to increase efficiency while reducing color shift. This is achieved by balancing contrast modulation against absorption for both pass and block polarization states. The first polarizing layer 402 may use an oriented polyvinyl alcohol (PVA) matrix with an iodine stain to provide absorption. Adjusting stain concentration, stain duration, and PVA thickness creates various leak amplitudes with corresponding pass state profiles. The fabrication of the iodine polarizer is described further below. Other constructions, for example dye based PVA, K-type, and lyotropic polarizers are also suitable for use in the first polarizing layer 402, for example as described in U.S. patent application Ser. No. 09/426,288, incorporated herein by reference.

An optional retardation compensating layer 404 may be placed below the first polarizer 402. An optional touch panel 416 may be provided with the display unit 400 to permit the user to enter information to the device using the display unit 400. The touch panel 416 may be coupled to the controller 409. Although the touch panel 416 is illustrated in a position above the first polarizer 402, the touch panel 416 may be placed in any suitable position in the stack of layers forming the display unit 400.

Layers 406 and 410 are glass layers that sandwich the liquid crystal display (LCD) layer 408. A controller 409 is typically coupled to the LCD layer 408 to control the polarization rotation state of the different pixels of the LCD layer 408, so as to control the information seen by the viewer.

A polarizer/transflector layer 412 is disposed below the LCD glass layer 410. The polarizer/transflector layer 412 may be a reflective polarizer, in other words a polarizer that reflects light at one polarization and transmits light in the orthogonal polarization. The polarizer/transflector layer 412 may also include one or more diffusive layers to provide efficient, broadband reflectivity and system viewing angle, rather than a metallic, partial mirror. A backlight 414 is disposed below the polarizer/transflective layer 412 that provides light to the viewer under conditions where there is insufficient ambient light to view the display 400.

The display operates as follows. Ambient light ray 420 has a polarization orthogonal to the pass polarization state of the first polarizer 402, and is absorbed in the first polarizer 402. In the illustrated embodiment, the pass polarization direction of the first polarizer 402 is in the plane of the figure. Ambient light ray 422 has a polarization that is transmitted by the first polarizing layer 402, and is transmitted through the LCD 408 without having its polarization rotated. The ray 422 is transmitted through the polarizer/transflective layer 412, and may be subsequently absorbed or diffusely attenuated.

Another ambient ray 424 is transmitted through the first polarizing layer 402 and the LCD 408. Ray 424 passes through a region where the LCD layer 408 rotates the polarization of ray 424. The polarization-rotated ray 424 is, therefore, reflected by the polarizer/transflective layer 412 as ray 426, which is polarization rotated on its passage back through the LCD 408, and is transmitted back through the first polarizer 402 for viewing by the user.

When operating under backlighting, backlight ray 430 is transmitted through the polarizer/transflector 412. The polarization of ray 430 is not rotated by the LCD 408, and so ray 408 passes through the first polarizing layer 402 to be viewed by the viewer. Backlight ray 432 is transmitted through the polarizer/transflector 412, and through a portion of the LCD 408 that rotates polarization of incident light. Therefore, the polarization of ray 432 is in a state that is blocked by the first polarization layer 402 and is not transmitted to the viewer. Backlight ray 434 has a polarization that is not transmitted through the polarizer/transflector 412.

Accordingly, under ambient lighting conditions, those rays whose polarization is rotated upon transmission through the LCD 408 form the image seen by the user. In contrast, under backlighting, those rays whose polarization is not rotated by the LCD 408 form the image viewed by the user. Therefore, under ambient lighting conditions the characters displayed on the screen may be dark while the background is light, but under backlighting conditions the characters appear to be light on a dark background. In other words, the backlit image is inverted relative to the ambient reflective image. This problem may be overcome electronically, by inverting the parity of the LCD display when the backlight is illuminated.

It will be appreciated that the display may be monochromatic, or may be a color display, with different pixels including different color filters, so as to produce different colors. It will also be appreciated that some embodiments of displays that use polarizer/transflective layers below the LCD are configured to avoid inverting the image upon use of the backlight. One approach to providing a non-inverting display is to have the transmission polarization axis of the transflector 412 set at an angle between 0° and 90°, for example as described in U.S. Pat. No. 6,124,971, incorporated herein by reference. Furthermore, more than one reflecting polarizer may be used as the transflector 412, for example as described in U.S. patent application Ser. No. 09/551,111, incorporated herein by reference.

Different samples of iodine-based absorbing polarizer were fabricated and tested in the embodiment illustrated in FIG. 4. The polarizers were fabricated by passing polyvinyl alcohol (PVA) film into a series of aqueous baths that allow the PVA film to accept iodine molecules and, with the use of borates in the third bath, cross-link the PVA film. The PVA film may be pre-stretched or may be stretched during the process. Films that are stretched during the process may be stretched during either or both the staining or cross-linking stages.

A typical sequence includes: washing by immersing the PVA film in a first bath to remove plasticizers; staining by immersing the film in an iodine bath containing free iodine and potassium iodide (KI); cross-linking by immersing the film in a boration bath; and rinsing in a final rinse bath. The cured film is then transported through a chemical rinse to adjust the iodine content and to remove surface deposits from the surface of the film. The first bath may be omitted where the PVA film has been pre-stretched. The concentration of free iodine in the second bath controls the amount of iodine present in the final polarizer film. The boration bath includes borax, boric acid and/or KI, and may also contain zinc chloride.

An important part of the staining process is the stretching and orientation of the PVA molecules. Several methods of molecular orientation may be used, including dry stretching prior to immersion in the staining bath, or wet stretching where the PVA is stretched by up to seven times its original length under tension during the staining process Dwell times in the staining bath typically range from 5 to 60 seconds depending on iodine concentration. Dwell time in the boration bath typically ranges from 20 to more than 180 seconds depending on the temperature of the bath. The temperature of the boration bath typically ranges from 50° C. to 80° C., depending on the properties of the PVA film.

The final rinse step is performed in de-ionized water (DIW), at a bath temperature in the range 15° C. to 40° C. After the rinse, the film may be passed through a dryer to reduce the water content level.

Five samples were fabricated, using the fabrication process conditions summarized in Table II. The variants in the process were stain concentration, KI concentration, stain duration and cure time.

TABLE II

Summary of Process Conditions for Samples A–E

| Polarizer Sample | A | B | C | D | E |
|---|---|---|---|---|---|
| Stain formulation | | | | | |
| Iodine (wt %) | 0.05 | 0.2 | 0.2 | 0.1 | 0.2 |
| KI (wt %) | 21 | 21 | 21 | 21 | 21 |
| DIW (wt %) | 78.95 | 78.8 | 78.8 | 78.8 | 78.8 |
| Stain Temperature (° C.) | 30 | 30 | 30 | 30 | 30 |
| Stain Time (s) | 25 | 20 | 35 | 25 | 25 |
| Boration Formulation | | | | | |
| Boric acid (wt %) | 15 | 15 | 15 | 15 | 15 |
| Borax (wt %) | 4.5 | 4.5 | 4.5 | 4.5 | 4.5 |
| DIW (wt %) | 81.5 | 81.5 | 81.5 | 81.5 | 81.5 |
| Boration temp. (° C.) | 65 | 65 | 65 | 65 | 65 |
| Boration time (s) | 25 | 20 | 35 | 25 | 25 |
| Rinsing formulation | | | | | |
| DIW (wt %) | 100 | 100 | 100 | 100 | 100 |
| Rinsing temp. (° C.) | 30 | 30 | 30 | 30 | 30 |
| Rinsing time (s) | 25 | 20 | 35 | 25 | 25 |

Figure 5A:
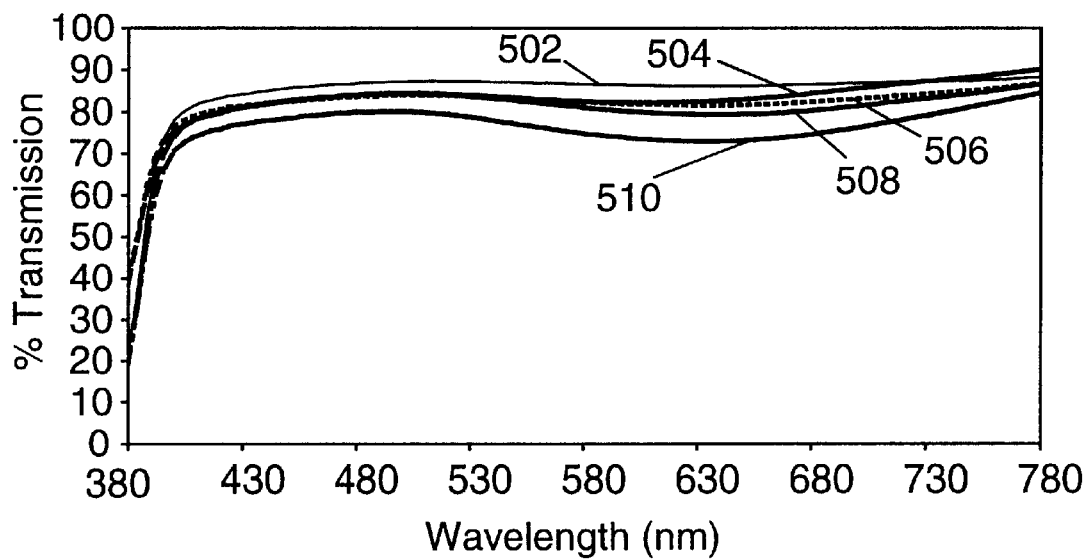
FIGS. 5A and 5B respectively illustrate single pass transmission spectra for absorbing polarizer samples A–E for light polarized parallel to the pass and block states of the polarizer samples.
Figure 5B:
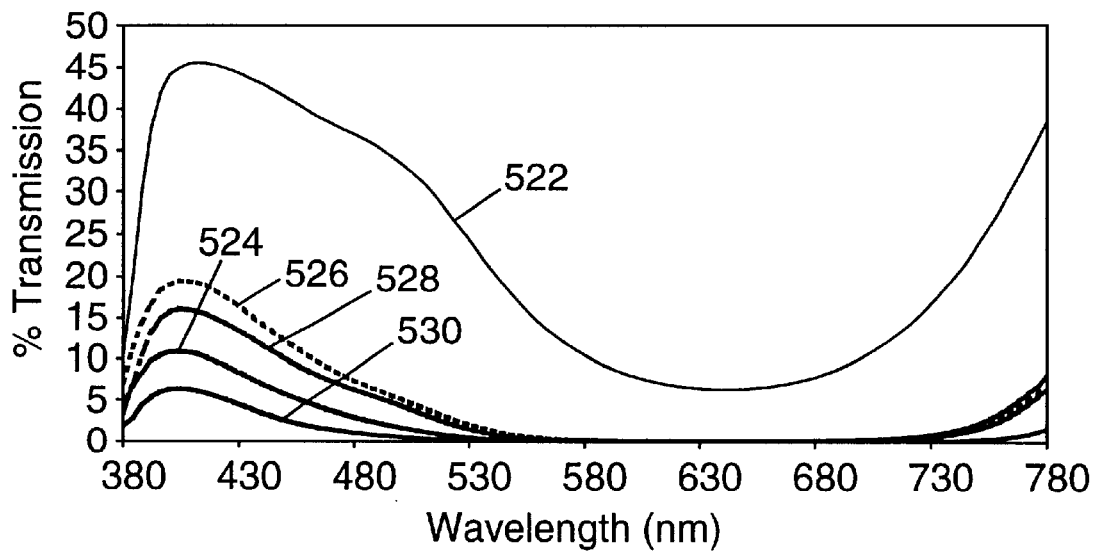

The single pass transmission spectra for light in the pass polarization state and in the block polarization state were measured for each of the samples A–E, and are presented in FIGS. 5A and 5B respectively. The different curves presented in FIGS. 5A and 5B are labeled according to the labels presented in Table III. For example, curve 502 in FIG. 5A represents the single-pass, pass state transmission for Sample A, and curve 530 represents the single pass, block state transmission for Sample E.

Figure 6A:
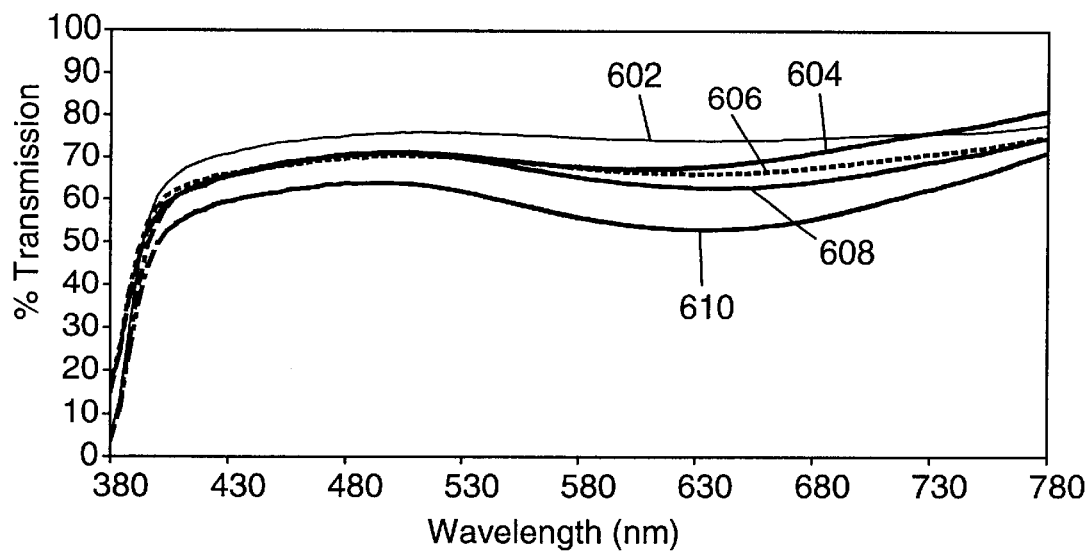
FIGS. 6A and 6B respectively illustrate double pass transmission spectra for absorbing polarizer samples A–E for light polarized parallel to the pass and block states of the polarizer samples.
Figure 6B:
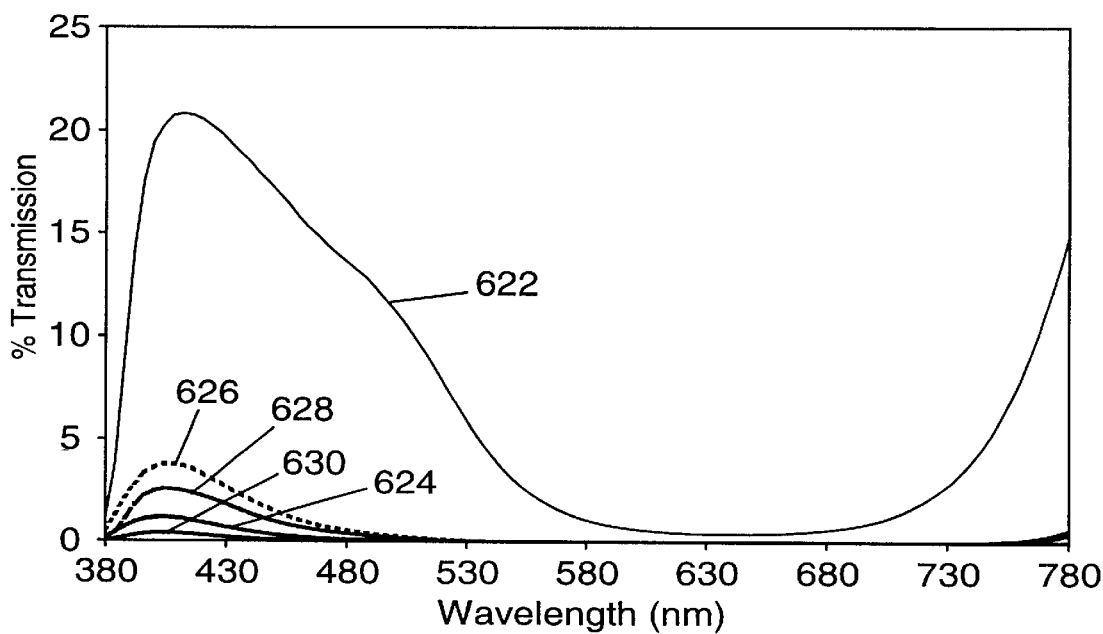

The double pass transmission through polarizer samples A–E is illustrated in FIGS. 6A and 6B for light polarized parallel to the pass and block states respectively. The double pass transmission curves were calculated by convolving the curves of FIGS. 5A and 5B. Table III also lists the relationship between the curve numbers presented in FIGS. 6A and 6B and the representative samples.

TABLE III

Summary of Curves Related to Sample Type

| Sample | FIG. 5A | FIG. 5B | FIG. 6A | FIG. 6B |
|---|---|---|---|---|
| A | 502 | 522 | 602 | 622 |
| B | 504 | 524 | 604 | 624 |
| C | 506 | 526 | 606 | 626 |
| D | 508 | 528 | 608 | 628 |
| E | 510 | 530 | 610 | 630 |

The double pass performance of each of the polarizer samples A–E is presented in Table IV. The use of a C-illuminant was assumed for calculating color shift. The performances of the Sanritz 5518 and Nitto polarizers, summarized in Table I, are provided in Table IV for comparison.

TABLE IV

Summary of Double-Pass Performance Characteristics of Polarizer Samples A–E

| | Efficiency (%) | Δx | Δy | Contrast Modulation |
|---|---|---|---|---|
| A-illuminant | | | | |
| A | 78.0 | 0.0143 | −0.0048 | 0.505 |
| B | 68.8 | −0.0024 | 0.0017 | 0.984 |
| C | 68.3 | −0.0045 | 0.0013 | 0.949 |
| D | 66.6 | −0.0092 | 0.0020 | 0.959 |
| E | 57.7 | −0.0142 | 0.0021 | 0.994 |
| 5518 | 71.1 | 0.0093 | 0.0092 | 0.996 |
| Nitto | 73.4 | 0.0017 | 0.0050 | 0.994 |
| C-illuminant | | | | |
| A | 79.3% | −0.0157 | −0.0141 | 0.439 |
| B | 69.2% | −0.0018 | 0.0028 | 0.973 |
| C | 68.8% | −0.0039 | 0.0001 | 0.921 |
| D | 67.5% | −0.008 | −0.0008 | 0.936 |
| E | 58.8% | −0.0128 | −0.0027 | 0.989 |
| 5518 | 70.7% | 0.0143 | 0.0245 | 0.995 |
| Nitto | 73.5% | 0.0039 | 0.0117 | 0.991 |

Controlling the magnitude of the extinction leak in polarizer samples A–E allows for a balanced pass state amplitude giving a neutral color. Color shifts for the samples are below the minimum threshold for color discrimination while efficiency and contrast modulation tradeoffs may be balanced. In all of the samples, the efficiency was higher than 60%, and in all of the samples except one, the efficiency was higher than 65% and higher than 68%, for a C-illuminant. Furthermore, all but one of the samples demonstrated a contrast modulation in excess of 0.90, which is adequate performance. However, enhanced performance is seen with a contrast modulation in excess of 0.95, a value exceeded by samples B and E. Samples A and E both produced contrast in excess of 0.97.

Comparison of the samples with the commercially available polarizers shows that the samples demonstrate slightly lower efficiency and contrast modulation, but have a significantly reduced color shift, especially samples B–E. When compared with a C-illuminant, Samples B and C present a small color shift where the absolute values (|Δx| and |Δy|) and the magnitudes of both Δx and Δy are less than 0.005, and are less than 0.004. Furthermore, Δx and |Δx|≦0.002 and Δy and |Δy|≦0.003 for Sample B. When compared with an A-illuminant, the color shift of the samples is less. For example, the color shift of Sample B was Δx=−0.0018 and Δy=0.0028, which is considerably less than the Nitto polarizer, the best commercial polarizer tested. The sample polarizers fabricated according to the method described above, in which the losses at the blue portion of the spectrum are less than with conventional polarizers, and which therefore produce small color shifts, may be referred to as color-neutral polarizers.

The benefits of neutral color performance of the polarizer samples A–E may be realized in a system by using a transflector/polarizer layer 412 having a flat reflective spectral response. In one embodiment, the transflector/polarizer layer 412 is a reflective polarizer. The spectral properties of the reflective polarizer may be tuned to give a relatively flat spectrum that can maintain the input spectral power distribution. The reflective polarizer may be, for example, a multilayer reflective polarizer, a cholesteric reflective polarizer, a dispersed phase reflective polarizer, or a wire grid reflective polarizer.

One particular example of a transflector/polarizer layer 412 is a TDF film, produced by 3M Company, St. Paul, Minn., and shown schematically in FIG. 7 as element 700. Layer 702 is a diffusing adhesive used to bond the element 700 to the liquid crystal display glass layer 410. Layer 702 is preferably polarization preserving with a diffusion profile optimized for display viewing and reflected brightness. Layer 704 a multilayer reflective polarizer and optional layer 706 is a partial absorber layer with an average transmission preferably between 30% and 70%. The multilayer reflective polarizer 704 typically includes a first set of isotropic layers, with a second set of layers interleaved between the layers of the first set, the layers of the second set including uniaxially oriented film. The refractive index of the uniaxial layers, for light in one polarization state, is typically very close to the refractive index of the isotropic layers. Thus the polarizer transmits light in this polarization state. The refractive index of the uniaxial layers, for light in the orthogonal polarization state, is different from that of the isotropic layers. Where the layer thickness is selected to be around one quarter wavelength thick, the stack of layers reflects light in the orthogonal polarization state.

It will be appreciated that a reflective polarizer 704 produces a bright pixel in the transflective display 400 by reflecting one polarization state and produces a dark pixel in the transflective display 400 by transmitting the orthogonal polarization state. The light thus transmitted is passed to the partial absorber layer 706. In backlit operation however, the reflective polarizer transmits only one polarization state, producing an inverted image, as indicated above. Consequently, an inverted image is created when switching from ambient to backlit operation. Besides the unique backlit appearance, one of the main advantages of using a reflective polarizer 704 is that the reflection and transmission axes are independent, and so the reflective polarizer operates at near optimum efficiency for both reflection and transmission. This reduces the deleterious effects of trading off reflection and transmission that arise when using metallic based transflectors.

In addition, the reflection spectrum of the reflective polarizer may be adjusted by controlling the optical properties of the reflective polarizer in order to maintain the input spectral power distribution. In the case of a multilayer reflective polarizer, an appropriate distribution of layer thicknesses may be used to provide reflection over a desired wavelength band. Where a cholesteric reflective polarizer is used as the transflector, the chiral pitch is provided with the appropriate gradient to cover the desired wavelength band. Analogous criteria may be met for the disperse phase reflective polarizer and the wire grid polarizer to achieve the desired chromatic performance.

Figure 8:
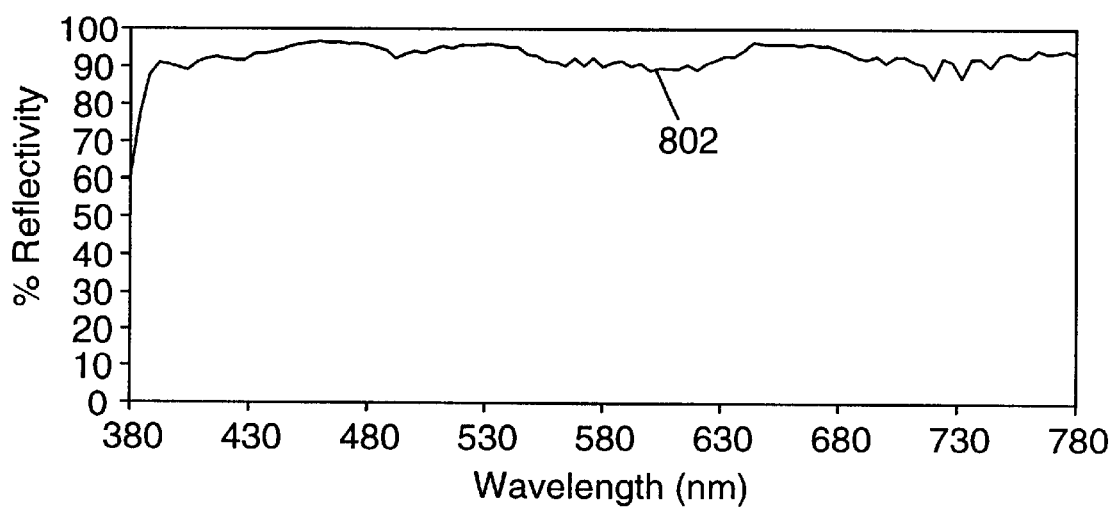
FIG. 8 is a graph showing the reflectivity spectrum of the transflector/polarizer layer illustrated in FIG. 7, across the visible spectrum.

The measured reflective performance of one example of a multilayer reflective polarizer 704 is shown as curve 802 in FIG. 8. The multilayer reflective polarizer 704 has a relatively flat reflectivity across the visible spectrum. Unlike the silver reflective coating, there is no appreciable roll-off in the blue, and so the blue rolloff is small. Consequently, the color shift for visible light reflected by the multilayer reflective polarizer is less than about Δx=−0.0037 and Δy=−0.0017. The reflectivity falls off in the ultra-violet, which is not detected by the human eye. Also, the average reflectivity across the visible portion of the spectrum is high, averaging over 92%, thus increasing overall system efficiency. This compares with the average reflectivity across the visible spectrum for a transflecting silver layer of only about 82%. Since the reflective polarizer operates with an inverted backlit image, the tradeoff between reflective and transmissive mode is eliminated. Consequently, the reflected efficiency is higher than silver at any level of acceptable backlit operation.

Figure 9:
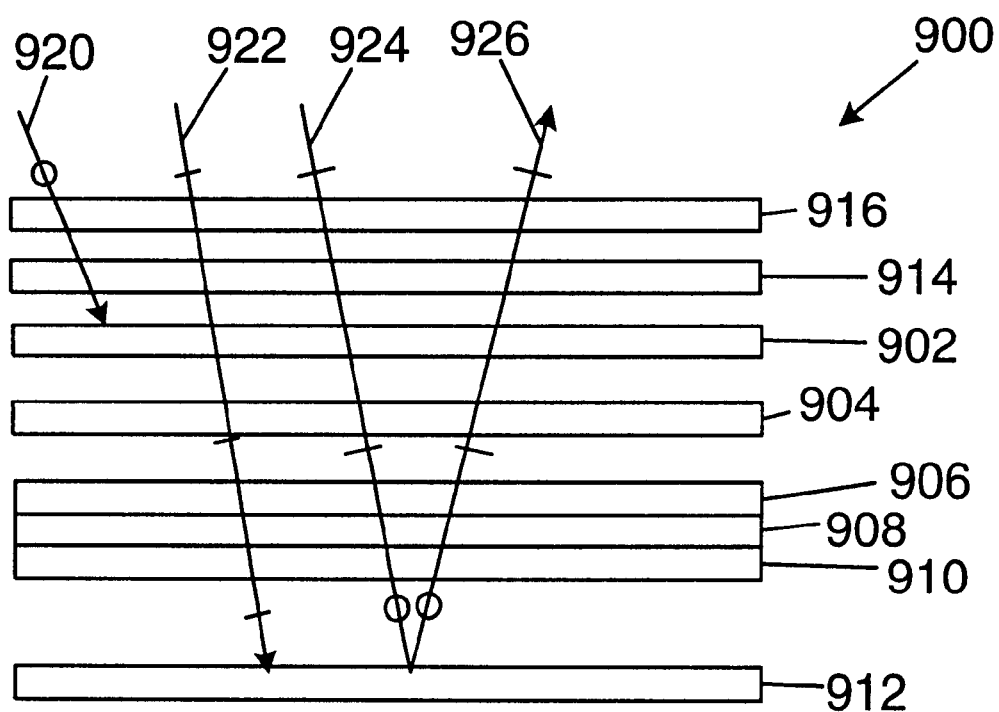
FIG. 9 schematically illustrates a reflective display according to the present invention.

The need for white displays also extends to purely reflective display systems, for example as may be used in a pocket calculator. An embodiment of a reflective display 900 is illustrated in FIG. 9. The reflective display includes a first polarizing layer 902 formed from an absorbing polarizer. The first polarizing layer 902 may be optically tuned to maximize while minimizing color shift, and may be of the type discussed above with respect to polarizer layer 402. An optional compensating retarder layer 904 may be provided below the first polarizing layer 902. An optional touch panel 916 may be also be provided with the reflective display 900.

Layers 906 and 910 are glass layers that sandwich the LCD layer 908. A polarization sensitive reflector 912 is disposed below the LCD glass layer 910. The polarization sensitive reflector 912 reflects light of only one polarization and may be, for example, a multiple layer reflective polarizer, a cholesteric reflective polarizer, a disperse phase reflective polarizer or a wire grid polarizer. The polarization sensitive polarizer may also be an absorbing polarizer having a highly reflective sublayer to reflect light transmitted through the absorbing polarizer. The polarization sensitive reflector 912 may also include one or more diffusive layers to provide efficient, broadband reflectivity and system viewing angle.

The display 900 operates in a manner similar to that for transflective display 400. Ambient light ray 920 is absorbed in the first polarizer layer 902. Ambient light ray 922 is transmitted through the first polarizer layer and through the LCD layer 908 without its polarization being rotated, and so is either transmitted through or absorbed in the polarization sensitive reflector 912. Ambient light ray 924 is transmitted through the first polarizer layer 902 and is polarization rotated on passing through the LCD layer 908 and is, therefore, reflected from the polarization sensitive reflector 912 as ray 926. Ray 926 is polarization rotated on passing back through the LCD layer 908 and emerges from the first polarizer layer to be viewed by the user.

A frontlight 914 may be used above the first polarizer layer 902 for supplemental viewing if ambient lighting is insufficient for viewing the displayed image. Where the polarization sensitive reflector 912 uses an absorbing polarizer and a reflector, the absorbing polarizer may be of the type of absorbing polarizer discussed above with respect to polarizer 402. A spectrally flat reflector, such the Enhanced Specular Reflector (ESR), available from 3M Company, St. Paul, Minn., may be coupled with the absorbing polarizer using a suitable adhesive to form the reflective polarizer. ESR is a stack of a first set of layers interleaved with a second set of layers. The refractive index of the first set of layers is different from the refractive index of the second set of layers. Where the layer thickness is selected to be around one quarter wavelength, the light is reflected. By including a range of layer thicknesses in the stack, the ESR may be highly reflective over a range of wavelengths.

Figure 7:
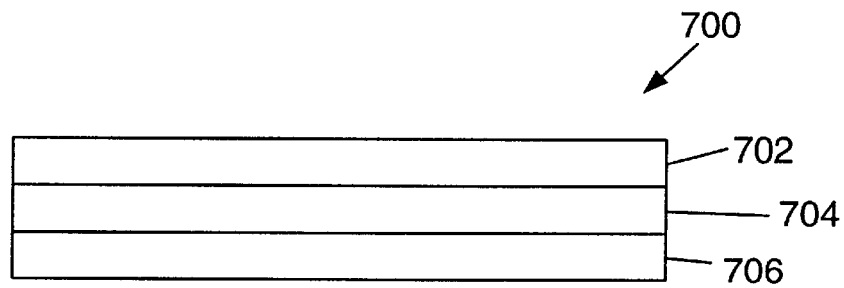
FIG. 7 schematically illustrates a cross-section through a one particular embodiment of a transflector/polarizer layer.

In another embodiment, the polarization sensitive reflector 912 may be a TDF layer, as described with respect to FIG. 7, with an opaque back layer to provide for ambient black state performance. These combinations maintain the input spectral power distribution for a paper white reflective display.

In another embodiment, the polarization sensitive reflector 912 may be an absorbing polarizer followed by two reflecting polarizers having their optical transmission axes crossed relative to each other. In yet another embodiment, the polarization sensitive reflector 912 may be an absorbing polarizer followed by a reflecting polarizer having its transmission axis crossed relative to the transmission axis of the absorbing polarizer. Other types of polarization sensitive reflector 912 may also be used.

Two different sample LCD display units were constructed, using identical STN cells. The first sample unit, referred to as Sample 1, was a commercially available unit having a structure like that illustrated in FIG. 1. Sample 1 used conventional absorbing polarizers for the first and second polarizing layers 102 and 112, having spectral characteristics similar to those of the Sanritz 5518 polarizer. The transflector layer 114 used a thin layer of aluminum.

The second sample, referred to as Sample 2, was fabricated by taking a display unit like that of Sample 1, and replacing the first polarizer layer with a color neutral first polarizer 402 and replacing the second polarizing layer 112 and transflector layer 114 with a TDF layer 700. The resultant structure was like that illustrated in FIG. 4, and included a compensator 404. The first polarizer layer 402 was formed from polarizer Sample B listed in Table II, and the TDF layer 700 operated as the polarizer/transflector layer 412. The TDF layer 700 was placed onto the lower LCD glass layer 410 with its reflection axis oriented parallel to the transmission axis of the original second absorbing polarizer. The first polarizer layer 402 was aligned onto the cell by eye judging against the best color performance.

Both systems incorporated a compensation film between the first polarizer 102, 402 and the upper glass layer 106 and 406. The LCD layers in Samples 1 and 2 were identical.

Light from each of the sample display units was detected using a chroma meter positioned on axis above the display under test. A summary of the chromatic data obtained from these experiments is listed in Table V. Overhead fluorescent light fixtures provided ambient lighting in the experimental measurements. The displays were driven to display full light reflection for all pixels, so that the screen appeared as bright as possible. The light reflected form the display was measured using a colormeter. The displays were then driven so that none of the pixels reflected any ambient light, and the light reflected form the display again measured with the colormeter. A reflective white standard was used to provide a reference white point. The white standard is commercially available from Labsphere, USA, under the name Spectralon with identification number: SRS-99-020. A summary of the reflected luminance (in foot Lamberts) for the Samples in their on ($Y_{on}$) and off ($Y_{off}$) states is provided in Table V, along with the color co-ordinates of the reflected light.

TABLE V

Summary of Chromatic Measurements for Sample Display Units.

|  | $Y_{on}$ (fL) | x | y | $Y_{off}$ (fL) |
|---|---|---|---|---|
| Sample 1 | 7.16 | 0.396 | 0.437 | 1.51 |
| Sample 2 | 13.7 | 0.425 | 0.423 | 4.37 |
| White Standard | 65.4 | 0.419 | 0.412 | n/a |

An efficiency calculation, defined as the ratio of display white state brightness to that of the white standard, along with the respective color shift and contrast modulation measured for each display are summarized in Table VI.

TABLE VI

Comparison of Sample Display Units with White Standard

|  | Efficiency | Δx | Δy | Contrast Modulation |
|---|---|---|---|---|
| Sample 1 | 10.9% | 0.023 | −0.025 | 0.65 |
| Sample 2 | 20.9% | −0.006 | −0.011 | 0.52 |

The color shift of Sample Display Unit 2 is less than the color shift of Sample Display Unit 1, and so Sample Display Unit 2 is more chromatically neutral than Sample Display Unit 1. Sample Display Unit 2 also demonstrates an efficiency of approximately twice that of Sample Display Unit 1. Although the contrast modulation for Sample Display Unit 2 was less than for Sample Display Unit 1, it was still easy for a viewer to read the information on Sample Display Unit 2. Moreover, the increased efficiency of Sample Display Unit 2 produced almost a doubling of the reflected brightness, resulting in a perceived contrast improvement. The image on Sample Display Unit 2 looked distinctly more white/black than the image on Sample Display Unit 1.

Overall contrast modulation of Sample Display Unit 2 may be improved with redesign of the compensation film. Since the compensation film was designed to operate with polarizers that manifest a blue drop-off, the polarizers used in Sample Display Unit 2 add additional dynamic color range requiring a different degree of compensation.

The comparison between Sample Display Units 1 and 2 shows that the use of an optimized polarizer system, both first polarizer and polarizer/transflector, in which efficiency and color shift are optimized, allows new performance advantages to be realized.

Since transflective displays operate primarily in ambient mode, most systems have monochromatic or quasichromatic backlights where spectrally flat polarizers have limited differentiation. The use of spectrally flat polarizers provide greater advantages in backlit situations when using broadband or tri-emission (red, green, blue) light sources.

Although described in terms of a transflective display having an inverted image, the invention may also be used in transflective displays that have a non-inverted image, for example as described in WO 97/01788 and U.S. patent application Ser. No. 09/551,111, both incorporated herein by reference.

One advantage of the invention is that the reflective element in a reflective or transflective display reflects substantially all of the blue ambient light that passes through the LCD. Another advantage of the invention is that the transmission spectra of the polarizers and/or the reflective spectrum of the reflector/transflector are balanced so that the ambient light reflected by the display to the viewer is substantially perceived as being white.

Figure 10:
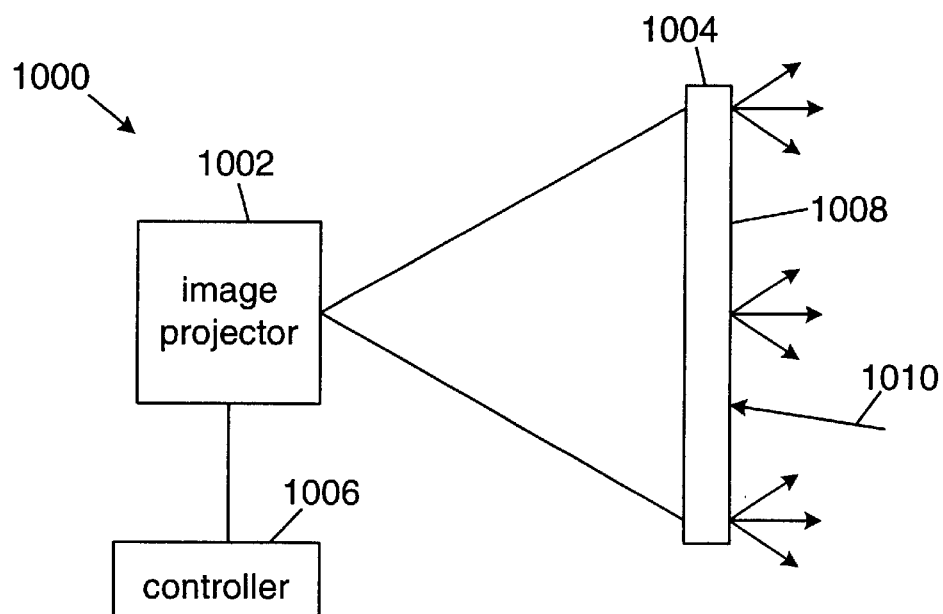
FIG. 10 schematically illustrates a rear projection system.

Although the invention has been described in terms of use in reflective and transflective LCD displays, the advantages provided by color-neutral polarizers may also be realized in other types of information display system. For example, one other approach to information display, illustrated in FIG. 10, is to use a rear projection display 1000, where the information to be shown to one or more viewers is projected by a light image projector 1002 to a rear projection screen 1004. The light image projector may be coupled to a controller 1006 that controls the image projected from the light image projector 1002. For example, the light image projector 1002 may be a LCD-based color image projector and the controller 1006 may be a computer.

The screen 1004 includes a disperser layer to disperse the light so that the viewer can see the image from all points of the screen. The disperser layer may include any suitable type of dispersing layer, for example a bulk diffusing layer (scattering particles disposed randomly within a bulk medium), a lenticular lens array, a micro-structured surface, or a beaded layer. The disperser layer may also include a combination of more than one dispersing layers, of the same or of differing types.

Important characteristics of a projection system include the screen gain, a representation of the screen's brightness; the viewing angle, the angle relative to the axis at which the gain of the screen drops to half of the peak gain, or to half of the one-axis gain; and the contrast. Contrast is generally the ratio of luminance of a projected white image to that of a projected black image. When a projection display is used in the presence of ambient light, some of the ambient light may be reflected from the surface of the screen or from within the screen or the projector system. The reflected light typically includes both specular and diffuse components. The ambient reflection tends to decrease the contrast of the screen. Thus, if the screen is used in the presence of ambient light, the contrast ratio is also dependent upon the ability of the screen to avoid reflecting ambient light back to the viewer.

Another important characteristic of a screen is its overall spectral performance, in other words its ability to maintain the spectrum of the light incident on its input surface. Where the screen is formed from one or more polymer layers, the screen often tends to display a decreased ability to transmit blue light, since the blue portion of the visible spectrum is preferentially absorbed in the polymer. Thus, images often suffer a color shift when being displayed on a projection screen.

Another important characteristic of rear projection screens is resolution, which is becoming increasingly more important where there are higher resolution requirements, for example in high definition television. The resolution of a screen is generally defined as a measure of the finest detail that can be distinguished in an image projected on the screen. One method of measuring resolution is accomplished by projecting an image on the screen and measuring the modulation depth, as is further described in U.S. Pat. No. 6,163,402, incorporated herein by reference. However, since the resolution is related to the screen contrast, a reduction in contrast resulting from ambient light also results in a reduction in the resolution.

Ambient light 1010 from the viewing side 1008 of the screen 1004 may be diffusely reflected or specularly reflected. Specular reflection is commonly reduced by using an anti-reflection (AR) coating on the viewing surface of the screen, or by a matte finish, or by a combination of the two. Specular reflection at the interfaces between different layers of a screen is commonly low because of index-matching between layers. Index-matching is, however, typically not perfect, and some specular reflection does occur.

Figure 11:
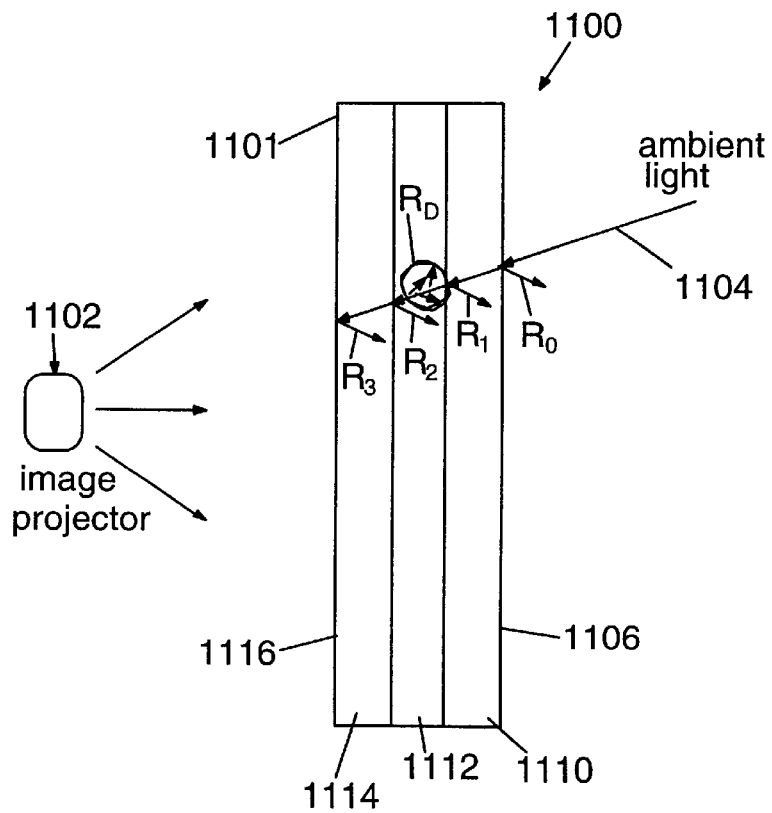
FIG. 11 schematically illustrates reflection of ambient light within a rear projection screen.

Furthermore, there is often a diffuse reflection within the screen 1004 itself, particularly where the screen 1004 includes a diffuse scattering layer. This is illustrated in FIG. 11, which shows a screen 1100 in a back-illumination configuration, with an image projector 1102 on an input side 1101. Ambient light 1104 is incident on the output side 1106 of the screen 1100. In the illustrated embodiment, the screen 1400 includes a number of different layers, 1110, 1112, and 1114. A fraction, Ro, of the incident ambient light is reflected by the front surface 1406 of the screen 1400. Further fractions $R_1$ and $R_2$, are reflected at the interface between the first and second layers 1110 and 1112, and at the interface between the second and third layers 1112 and 1114. A fraction, $R_3$, of the remaining ambient light 1104 is reflected off the input surface 1116 of the fourth layer 1114. Furthermore, a fraction, RD, of the ambient light 1104 is diffusely reflected light at one of the layers, typically a scattering layer. A significant fraction of all the reflected light is transmitted back out of the screen 1100 in the direction towards a viewer on the output side of the screen 1100. This ambient light exiting from the screen reduces the contrast of the desired image, and therefore negatively affects the resolution. It is, therefore, important to reduce the amount of ambient light that is reflected within the screen 1100 towards the viewer. It will be appreciated that the screen may be formed from a different number of layers from that illustrated.

One approach to reducing the amount of ambient light reflected to the viewer, described further in U.S. Pat. No. 6,163,402, is to provide a polarizer on the output side of the screen 1400. This approach reduces the amount of ambient light entering the screen 1400 by half and still permits significant throughput through the screen 1400 where the image is polarized parallel to the polarization transmission direction of the polarizer.

Figure 12:
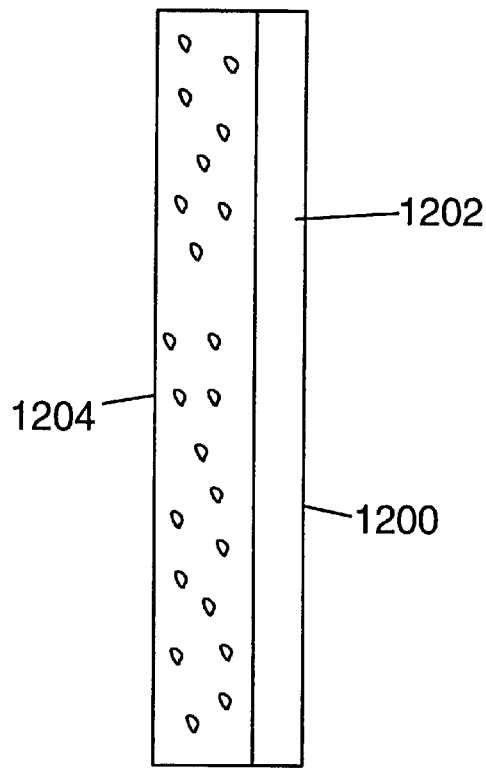
FIG. 12 schematically illustrates one embodiment of a rear projection screen according to the present invention and FIG. 13 schematically illustrates another embodiment of a rear projection screen according to the present invention.

One approach to enhancing the color of the viewed image, as well as the contrast, is to use a color neutral polarizer 1202 along with the dispersing layer 1204, as shown in FIG. 12 for the screen 1200. The color neutral polarizer 1202 absorbs half of the ambient light entering the screen 1200 and also absorbs ambient light reflected within the screen whose polarization has been rotated relative to the polarization state of the light entering the screen 1200.

Figure 13:
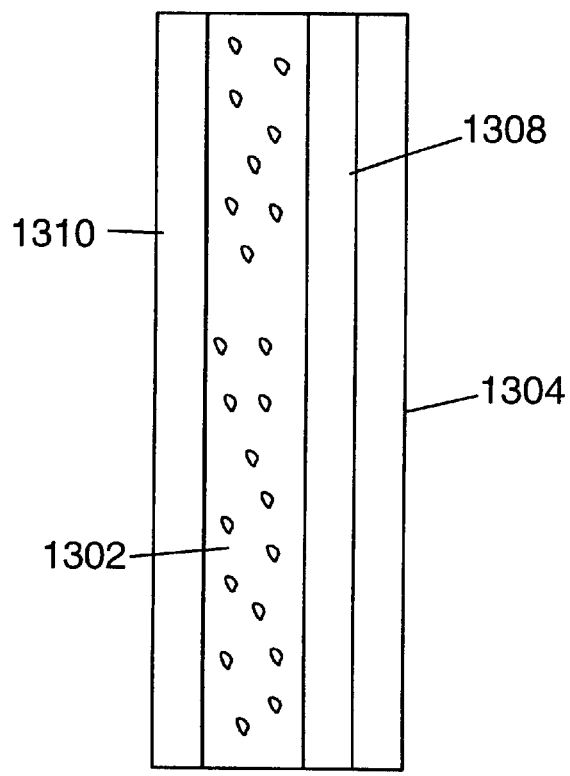

Another approach to improving screen contrast by reducing the amount of ambient light reflected to the viewer is to use a retarding layer between a polarizer on the viewing side of the screen and the disperser layer. This approach is described in U.S. patent application Ser. No. 09/274,585, incorporated herein by reference, and an embodiment of this approach is illustrated in FIG. 13. The screen 1300 includes a disperser layer 1302 and a color neutral absorbing polarizer 1304. A retarder layer 1308 is disposed between the polarizer 1304 and the disperser layer 1302. In this embodiment, ambient light that passes through the absorbing polarizer 1304 passes through the retarder layer 1308 and has its polarization state changed. Preferably, the retarder layer 1308 is a quarter-wave retarder layer, and so ambient light entering the disperser layer 1302 is approximately circularly polarized.

Any ambient light that is reflected by the disperser layer 1302 passes through the retarder layer 1308 once more, and the polarization of the light is further changed. If the light reflected from the disperser layer 1302 is circularly polarized, and the retarder layer 1308 is a quarter wave retarder, then the light is linearly polarized upon leaving the retarder layer 1308 into the polarizer 1304. Furthermore, the direction of polarization is rotated from that of the ambient light that originally passed through the polarizer 1304, and so the ambient light reflected from the disperser layer 1302 is absorbed in the polarizer 1306 and 1308.

Thus, the polarizer 1304 absorbs one fraction of the ambient light as it enters the screen 1300 and absorbs the other fraction that is reflected within the screen 1300 towards the viewer. Therefore, the polarizer 1304 reduces the contrast-diminishing effects of the ambient light.

It will be appreciated that image light passing through the screen 1300 should be polarized in a specific manner in order to avoid losses in the polarizer 1304. For example, the reflected ambient light propagates through the disperser layer 1302 towards the viewer with one handedness of circular polarization. The image light passing through the disperser layer 1302 is circularly polarized with the opposite handedness from the reflected ambient light. Therefore, when the image light passes through the retarder layer 1308, the polarization of the image light is changed by the retarder layer 1308 to a linear polarization that is parallel to the polarization transmission direction of the polarizer 1304, and so the image light is transmitted to the viewer. In order to condition the image light with the correct polarization before entering the disperser layer 1302, the image light may be passed through another retarder layer 1310 on the input side 1312 of the disperser layer 1302. Since it is pleasing to the viewer's eye that the screen appear a little blue, the polarizer may permit some degree of leakage of blue light in the block polarization state. Therefore, the polarizer need not be of as high contrast as is generally required in an LCD display.

The single pass color shifts of samples B and C, for a C-illuminant, and polarization co-efficiency are shown in Table VII.

TABLE VII

Single pass characteristics of Samples B and C

|  | Δx | Δy | Polarization Co-efficiency |
|---|---|---|---|
| Sample B | −0.0056 | −0.0061 | 0.9818 |
| Sample C | −0.0114 | −0.0133 | 0.9742 |

The polarization co-efficiency is defined as the square root of the contrast modulation. The polarization co-efficiency of Samples B and C is greater than 0.90, and in both cases is greater than 0.97.

Other embodiments of rear projection screen disclosed in U.S. patent application Ser. No. 09/274,585 may use a color neutral absorbing polarizer.

As noted above, the present invention is applicable to display devices, and is believed to be particularly useful for maintaining reduced color shift in display systems that include a polarizer. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An optical device, comprising:
   an absorbing polarizer having a double pass color shift of $|\Delta x| \leq 0.005$ and $|\Delta y| \leq 0.005$ for illumination by a C-illuminant, and a double pass contrast modulation of at least 90%;
   a liquid crystal display (LCD) layer disposed below the absorbing polarizer; and
   a reflective layer disposed below the LCD layer to reflect back light through the LCD and the absorbing polarizer to form an image.

2. A device as recited in claim 1, wherein the absorbing polarizer has a double pass color shift of $|\Delta x| \leq 0.004$ and $|\Delta y| \leq 0.004$ for illumination by a C-illuminant.

3. A device as recited in claim 1, wherein the absorbing polarizer has a double pass color shift of $|\Delta x| \leq 0.002$ and $|\Delta y| \leq 0.003$ for illumination by a C-illuminant.

4. A device as recited in claim 1, wherein the absorbing polarizer has a double pass contrast modulation of more than 95%.

5. A device as recited in claim 1, wherein the absorbing polarizer has a double pass contrast modulation of more than 97%.

6. A device as recited in claim 1, wherein the absorbing polarizer has a double pass efficiency of more than 60%.

7. A device as recited in claim 1, wherein the absorbing polarizer has a double pass efficiency of more than 68%.

8. A device as recited in claim 1, wherein the absorbing polarizer includes iodine as a polarization sensitive absorber.

9. A device as recited in claim 1, wherein the absorbing polarizer exhibits a double pass color shift having a negative value for $\Delta x$ when illuminated by an A-illuminant.

10. A device as recited in claim 1, wherein the absorbing polarizer exhibits a double pass color shift having a color shift of $\Delta x<0.005$ and $\Delta y<0.002$ when illuminated by an A-illuminant.

11. A device as recited in claim 10, wherein the absorbing polarizer exhibits a double pass color shift having a value of $\Delta x<0.003$ when illuminated by an A-illuminant.

12. A device as recited in claim 1, wherein light is blue shifted after double passing the absorbing polarizer.

13. An optical device, comprising:
  an absorbing polarizer having a double pass color shift of $\Delta x \leq 0.005$ and $\Delta y \leq 0.002$ and a double pass contrast modulation of at least 90% under illumination by an A-illuminant, and a double pass color shift of $\Delta x \leq 0.005$ and $\Delta y \leq 0.005$ under illumination by a C-illuminant;
  a liquid crystal display (LCD) layer disposed below the absorbing polarizer; and
  a reflective layer disposed below the LCD layer to reflect back light through the LCD and the absorbing polarizer to form an image.

14. A device as recited in claim 13, wherein the double pass color shift $\Delta x$ under illumination by the A-illuminant is negative.

15. A device as recited in claim 13, wherein the absorbing polarizer has a double pass contrast modulation of more than 95% under illumination by the A-illuminant.

16. A device as recited in claim 13, wherein the absorbing polarizer has a double pass contrast modulation of more than 97% under illumination by the A-illuminant.

17. A device as recited in claim 13, wherein the absorbing polarizer has a double pass efficiency of more than 60% under illumination by the A-illuminant.

18. A device as recited in claim 13, wherein the absorbing polarizer has a double pass efficiency of more than 68% under illumination by the A-illuminant.

19. A device as recited in claim 13, wherein light is blue shifted after double passing the absorbing polarizer.

20. A device as recited in claim 13, wherein the absorbing polarizer includes iodine as a polarization sensitive absorber.

21. A device for displaying information, comprising:
  two or more layers stacked together, at least one of the layers being an absorbing polarizer having a double pass color shift of $|\Delta x| \leq 0.005$ and $|\Delta y| \leq 0.005$ for illumination by a C-illuminant, and at least one of the layers including a liquid crystal display (LCD) layer disposed below the absorbing polarizer and a reflective layer disposed below the LCD layer to reflect back light through the LCD and the absorbing polarizer to form an image.

22. A device as recited in claim 21, wherein the double pass color shift through the two or more layers stacked together is less than $|\Delta x| \leq 0.01$ and $|\Delta y| \leq 0.015$ for illumination by a C-illuminant.

23. A device as recited in claim 21, wherein the reflective layer is a transflective layer.

24. A device as recited in claim 21, wherein the LCD layer further includes color filters for respective pixels of the LCD layer.

25. A device as recited in claim 21, further comprising a control unit coupled to the LCD layer to control polarization rotation of individual pixels of the LCD layer, so as to present an image on the device to a user.

26. A device as recited in claim 21, wherein one of the two or more layers includes a touch sensitive panel.

27. A device as recited in claim 23, further comprising a backlight disposed below the transflective layer.

28. A device as recited in claim 23, wherein the transflective layer has a single reflection color shift of $|\Delta x| \leq 0.005$ and $|\Delta y| \leq 0.002$ for illumination by a C-illuminant.

29. A device as recited in claim 23, wherein the transflective layer is a reflecting polarizer.

30. A device as recited in claim 29, wherein the reflecting polarizer has a pass polarization direction either substantially perpendicular or substantially parallel to a pass polarization direction of the absorbing polarizer.

31. A device as recited in claim 29, wherein the reflecting polarizer has a pass polarization direction oriented to be neither perpendicular nor parallel to a pass polarization direction of the absorbing polarizer.

32. A device as recited in claim 29, wherein the reflecting polarizer includes one of a multilayer reflecting polarizer, a wire grid polarizer, a cholesteric polarizer, and a dispersed phase polarizer.

33. A device as recited in claim 32, wherein the reflecting polarizer includes a cholesteric polarizer coupled to a retarding layer.

* * * * *

UNITED STATES PATENT AND TRADEMARK OFFICE
CERTIFICATE OF CORRECTION

PATENT NO. : 6,624,936 B2
DATED : September 23, 2003
INVENTOR(S) : Kotchick, Keith M.

It is certified that error appears in the above-identified patent and that said Letters Patent is hereby corrected as shown below:

<u>Title page,</u>
Item [56], References Cited, U.S. PATENT DOCUMENTS, please add the following references:

| | | |
|---|---|---|
| -- 6,008,871 | 12/28/99 | Okumura |
| 6,124,905 | 09/26/00 | Iijima |
| 6,124,971 | 09/26/00 | Ouderkirk et al. |
| 6,163,402 | 12/19/00 | Chou et al. -- |

FOREIGN PATENT DOCUMENTS, please add the following references:

| | | |
|---|---|---|
| -- WO 95/17303 | 06/29/95 | PCT |
| WO 96/03672 | 02/08/96 | JP |
| WO 97/01788 | 01/16/97 | PCT |
| WO 98/50818 | 11/12/98 | JP |
| WO 98/36248 | 07/22/99 | PCT |
| WO 99/36813 | 07/22/99 | PCT |
| WO 99/36814 | 07/22/99 | PCT |
| WO 99/53368 | 10/21/99 | JP |
| WO 99/53369 | 10/21/99 | JP |
| WO 99/59023 | 11/18/99 | JP |
| 0825477A2, A3 | 08/19/97 | EPO |
| 0867746A1 | 09/12/97 | EPO |
| 0884622A2,A3 | 06/09/98 | EPO |
| 0890866A2,A3 | 06/09/98 | EPO |
| 0890867A2,A3 | 07/09/98 | EPO |
| 0896241A2,A3 | 07/31/98 | EPO |
| 0913721A1 | 05/13/98 | EPO |
| 0935155A1 | 07/22/98 | EPO |
| 0942313A1 | 05/01/98 | EPO |
| 0953864A2,A3 | 04/30/99 | EPO |
| 1014160A1 | 05/12/99 | EPO -- |

UNITED STATES PATENT AND TRADEMARK OFFICE
CERTIFICATE OF CORRECTION

PATENT NO. : 6,624,936 B2
DATED : September 23, 2003
INVENTOR(S) : Kotchick, Keith M.

It is certified that error appears in the above-identified patent and that said Letters Patent is hereby corrected as shown below:

<u>Column 16,</u>
Line 65, delete "Ro" and insert in place thereof -- $R_o$ --

<u>Column 17,</u>
Line 5, delete "RD" and insert in place thereof -- $R_D$ --

<u>Column 18,</u>
Line 66, delete "|Δy" and insert in place thereof -- $|\Delta y|$ --

Signed and Sealed this

Fifteenth Day of June, 2004

JON W. DUDAS
*Acting Director of the United States Patent and Trademark Office*